April 1, 1924.
M. J. SMILEY
DIRIGIBLE LAMP SUPPORT FOR AUTOMOBILE HEADLIGHTS
Filed July 9, 1923
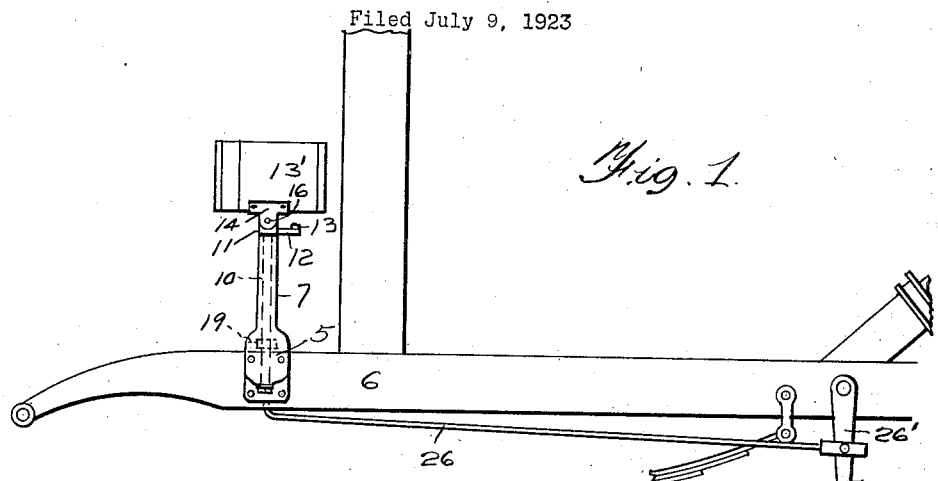
Fig. 1.
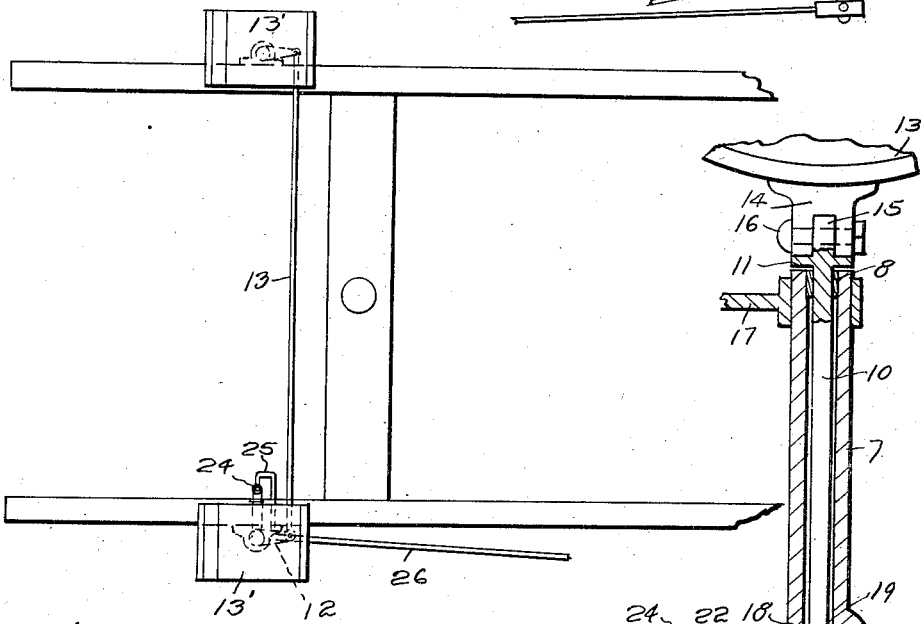
Fig. 2.
Fig. 3.
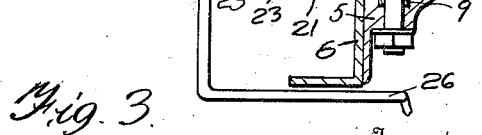
Inventor
M. J. Smiley,
By Samuel Herrick
Attorney Patented Apr. 1, 1924.

1,488,946

UNITED STATES PATENT OFFICE.

MYRON J. SMILEY, OF BELLEFOURCHE, SOUTH DAKOTA.

DIRIGIBLE LAMP SUPPORT FOR AUTOMOBILE HEADLIGHTS.

Application filed July 9, 1923. Serial No. 650,410.

*To all whom it may concern:*

Be it known that MYRON J. SMILEY, citizen of the United States, residing at Bellefourche, in the county of Butte and State of South Dakota, has invented certain new and useful Improvements in Dirigible Lamp Supports for Automobile Headlights, of which the following is a specification.

This invention relates to a dirigible lamp support for automobile headlights and it has for its object to provide an improved device of this character constructed in such manner that it will include only a few simple and inexpensive parts, will not be subject to excessive rattling and noise and will provide means wherein the vertical inclination of the light rays may be controlled in addition to causing said light rays to sweep in an arc when the vehicle is rounding a turn.

Further objects and advantages of the invention will be set forth in the detailed description which follows.

In the accompanying drawing:

Fig. 1 is a side elevation of a part of the frame of an automobile having the invention applied thereto;

Fig. 2 is a plan view thereof; and

Fig. 3 is a vertical sectional view through one of the brackets.

Like reference characters designate corresponding parts in all of the figures of the drawing.

In carrying out the invention I provide a pair of brackets which are bolted at 5 to the side frame members 6 of the chassis of the automobile. These brackets comprise upstanding tubular sleeves 7 having bushings 8 and 9 at their upper and lower ends in which stems 10 are mounted to turn. Heads 11 upon the upper ends of the stems 10 are provided with rearwardly projecting crank arms 12 which are connected by a laterally extending rod 13 so that the movement of one lamp is imparted to the other. The lamps 13' are carried by bifurcated lugs 14 which straddle upwardly extending projections 15 of the heads 11. Binding nuts and bolts 16 provide means for clamping the lamps in adjusted relation with respect to the heads 11 and thus the lamps may be tilted upwardly or downwardly in a vertical plane to thereby determine the point at which the light rays will be directed upon the roadway.

If desired, the standards 7 may be braced from each other by a brace bar indicated at 17 and by corresponding means these standards may be braced from the fenders, if desired.

One of the standards: viz; the standard on that side of the machine at which the steering post is located, is cut out, as indicated at 18, to permit of a crank arm 19 being secured, as by a pin 20, for example, to the stem 10. This crank arm carries a tubular extremity 21 into which a member 22 is threaded. A lock nut 23 on said member provides means for locking it in adjusted position. This member 22 has a bifurcated outer end 24 within which is pivoted an end 25 of an actuating rod 26. This rod is bent downwardly and outwardly beneath the side frame member 6 of the chassis and is then extended rearwardly and engaged with the swinging arm 26' which constitute an existing part of the steering mechanism of the automobile.

Thus as this arm 26' swings back and forth in the act of imparting the necessary turning movement to the front wheels of the automobile to properly steer the same, rod 26 will impart a turning movement to the stem 10 of one of the lamps and this turning movement will be imparted to the other of the lamp through the rod 13.

It is manifest that by adjusting the element 22 into and out of the tubular part 21 of the crank arm 19, this, in effect, lengthens or shortens said crank arm and correspondingly varies the degree of throw of the lamp.

It is to be understood that the invention is not limited to the precise construction set forth but that it includes within its purview whatever changes fairly come within either the terms or the spirit of the appended claim.

Having described my invention what I claim is:

The combination with the frame of an automobile, of a bracket comprising a tubular element the lower end of which is secured to the side frame member of the chassis of the automobile and the body of which lies above said side frame member, said tubular member being cut away at one side above the level of said side frame member to provide a laterally open part, a stem mounted in said tubular member, a lamp upon the upper end of said stem and means upon the lower end of said stem to engage with the lower end of the tubular member for preventing vertical movement of the stem with respect to said member, a longitudinally adjustable crank arm engaged with the stem and projecting through the laterally open part and across the top of the side frame member of the chassis inwardly and a member one end of which is engaged with the outer end of said crank arm and which extends downwardly and outwardly beneath the side frame member of said chassis and then rearwardly where it is connected to one of the moving parts of the steering mechanism of the automobile.

MYRON J. SMILEY.

Witnesses:
J. W. MALVIN,
J. SMITH.